United States Patent
Harel

(10) Patent No.: US 12,556,551 B1
(45) Date of Patent: Feb. 17, 2026

(54) DETECTION ENGINE WITH STATEFUL DETECTION WITH ENTITY STREAM

(71) Applicant: Wiz, Inc., New York, NY (US)

(72) Inventor: Itay Harel, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/986,948

(22) Filed: Dec. 19, 2024

(51) Int. Cl.
H04L 9/40 (2022.01)

(52) U.S. Cl.
CPC ...... *H04L 63/1416* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 9,680,855 B2 | 6/2017 | Schultz et al. | |
| 10,250,619 B1 | 4/2019 | Park et al. | |
| 10,826,931 B1 | 11/2020 | Quan et al. | |
| 10,911,468 B2 | 2/2021 | Muddu et al. | |
| 11,106,789 B2 | 8/2021 | Kraus et al. | |
| 11,411,970 B2 | 8/2022 | Hamdi | |
| 11,552,974 B1* | 1/2023 | Bagga | H04L 65/61 |
| 11,943,254 B2 | 3/2024 | Thompson | |
| 2019/0098037 A1* | 3/2019 | Shenoy, Jr. | H04L 63/1441 |
| 2019/0138727 A1* | 5/2019 | Dontov | G06F 11/1464 |
| 2021/0243217 A1* | 8/2021 | Stelmar Netto | H04L 63/1466 |
| 2023/0064153 A1* | 3/2023 | Kulandaivel | G07C 5/0816 |
| 2023/0113375 A1* | 4/2023 | Thomas | H04L 63/1441 726/23 |
| 2023/0156020 A1* | 5/2023 | McCarthy | H04L 63/20 726/22 |
| 2023/0208870 A1* | 6/2023 | Yellapragada | H04L 63/20 726/22 |
| 2023/0208871 A1* | 6/2023 | Yellapragada | G06N 3/045 726/25 |

* cited by examiner

Primary Examiner — Joseph P Hirl
Assistant Examiner — Hassan Saadoun
(74) Attorney, Agent, or Firm — M&B IP Analysts, LLC

(57) ABSTRACT

A system and method for detection of cybersecurity threats utilizing stateful detection of a data stream of a cloud entity is presented. The method includes detecting a cloud entity deployed in a cloud computing environment, the cloud entity including a plurality of cloud components; generating an event stream for the cloud entity, the event stream including events from each cloud component of the plurality of cloud components; detecting a cybersecurity risk based on: an event in the event stream at first time and an event in the event stream at a second time after the first time; and initiating a mitigation action in the cloud computing environment based on the detected cybersecurity risk.

25 Claims, 8 Drawing Sheets

DETECTION ENGINE WITH STATEFUL DETECTION WITH ENTITY STREAM

TECHNICAL FIELD

The present disclosure relates generally to the detection of cybersecurity threats, and specifically to the detection of cybersecurity threats utilizing data streams of cloud entity groups.

BACKGROUND

A challenge in detecting anomalous behavior in a cloud computing environment is the dynamic and highly distributed nature of these systems, which complicates distinguishing between normal and malicious activity.

Cloud environments operate on a shared infrastructure with highly variable workloads, auto-scaling, and multi-tenant usage patterns. This variability makes it difficult to establish a reliable baseline for "normal" behavior. For example, legitimate traffic spikes due to business growth or seasonal trends may appear similar to a Distributed Denial of Service (DDOS) attack, leading to false positives or missed threats.

Another complexity arises from the integration of diverse services, applications, and APIs across multiple cloud providers. Each service generates vast amounts of telemetry data, such as logs and metrics, often in inconsistent formats. Analyzing this data to identify subtle patterns of anomalous behavior requires significant contextual understanding, which can be difficult to achieve in a fragmented ecosystem.

Insider threats add another layer of difficulty, as malicious activity by authorized users can closely mimic legitimate actions. Detecting such threats requires deep visibility into user behavior, but over-reliance on logs can be problematic due to incomplete or delayed logging in some cloud environments.

Moreover, attackers often use advanced techniques, such as lateral movement or privilege escalation, to evade detection. These techniques are designed to blend into regular activity, making anomalies hard to spot without advanced correlation and context-aware analysis.

Also, the scale of cloud environments, with thousands of events per second, overwhelms traditional monitoring systems. High noise levels in alerts lead to alert fatigue for security teams, increasing the risk of overlooking genuine threats.

Together, these challenges make it difficult to reliably detect anomalous behavior in cloud environments, as the complexity and scale of operations hinder effective threat identification.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include detecting a cloud entity deployed in a cloud computing environment, the cloud entity including a plurality of cloud components. The method may also include generating an event stream over a time period for the cloud entity, the event stream including events from each cloud component of the plurality of cloud components. The method may furthermore include detecting a cybersecurity risk based on: an event in the event stream at a first time in the time period and an event in the event stream at a second time in the time period after the first time. The method may in addition include initiating a mitigation action in the cloud computing environment based on the detected cybersecurity risk. Other embodiments of this aspect include corresponding computer systems, apparatus, and computer programs recorded on one or more computer storage devices, each configured to perform the actions of the methods.

Implementations may include one or more of the following features. The method where the event at the first time is related to a first component. The method where the event at the second is related to a second component. The method may include: storing a state of the cloud entity based at least on an event at a first time. The method may include: detecting a change in the state of the cloud entity based on the event at first time and the event at a second time; and initiating the mitigation action in response to detecting the change in the state. The method where detecting a cloud entity further may include: querying a cloud log for a deployed cloud entity. The method where generating an event stream for a cloud entity further may include: extracting an event, an event record, and any combination thereof, from a cloud log, an enriched event log, a runtime data log, a network log, and any combination thereof. The method where generating an event stream for a cloud entity further may include: utilizing cloud components that are used by the cloud entity to perform a function. The method may include: generating an event stream for a cloud component based on extracting events, event records, and any combination thereof, from various data logs including a runtime event log, a cloud log, an enriched event log, a network log, and any combination thereof. The method where a cybersecurity risk indicates a potential of a cybersecurity attack, a vulnerability, a data breach, and any combination thereof. The method may include: initiating a mitigation action based on a type of cloud entity associated with the detected cybersecurity risk. The method where the mitigation action includes any one of: providing a software update, modifying an user permission, implementing an access control, disabling a compromised account, implementing a software patch, and any combination thereof. Implementations of the described techniques may include hardware, a method or process, or a computer tangible medium.

In one general aspect, non-transitory computer-readable medium may include one or more instructions that, when executed by one or more processing circuitry of a device, cause the device to: detect a cloud entity deployed in a cloud computing environment, the cloud entity including a plurality of cloud components; generate an event stream over a time period for the cloud entity, the event stream including events from each cloud component of the plurality of cloud components; detect a cybersecurity risk based on: Non-transitory computer-readable medium may also include an event in the event stream at a first time in the time period and an event in the event stream at a second time in the time period after the first time; and initiate a mitigation action in the cloud computing environment based on the detected cybersecurity risk. Other embodiments of this aspect include corresponding computer systems, apparatus, and computer programs recorded on one or more computer storage devices, each configured to perform the actions of the methods.

In one general aspect, a system may include one or more processing circuitry configured to: a cloud entity deployed in a cloud computing environment, the cloud entity including a plurality of cloud components. The system may furthermore generate an event stream over a time period for the cloud entity, the event stream including events from each cloud component of the plurality of cloud components. The system may in addition detect a cybersecurity risk. The system may moreover an event in the event stream at a first time in the time period and an event in the event stream at a second time in the time period after the first time. The system may also initiate a mitigation action in the cloud computing environment based on the detected cybersecurity risk. Other embodiments of this aspect include corresponding computer systems, apparatus, and computer programs recorded on one or more computer storage devices, each configured to perform the actions of the methods.

Implementations may include one or more of the following features. The system where the event at the first time is related to a first component. The system where the event at the second is related to a second component. The system where the one or more processing circuitry are further configured to: store a state of the cloud entity based at least on an event at a first time. The system where the one or more processing circuitry are further configured to: detect a change in the state of the cloud entity based on the event at first time and the event at a second time; and initiate the mitigation action in response to detecting the change in the state. The system where the one or more processing circuitry, when detecting a cloud entity, are configured to: query a cloud log for a deployed cloud entity. The system where the one or more processing circuitry, when generating an event stream for a cloud entity, are configured to: extract an event, an event record, and any combination thereof, from a cloud log, an enriched event log, a runtime data log, a network log, and any combination thereof. The system where the one or more processing circuitry, when generating an event stream for a cloud entity, are configured to: utilize cloud components that are used by the cloud entity to perform a function. The system where the one or more processing circuitry are further configured to: generate an event stream for a cloud component based on extracting events, event records, and any combination thereof, from various data logs including a runtime event log, a cloud log, an enriched event log, a network log, and any combination thereof. The system where a cybersecurity risk indicates a potential of a cybersecurity attack, a vulnerability, a data breach, and any combination thereof. The system where the one or more processing circuitry are further configured to: initiate a mitigation action based on a type of cloud entity associated with the detected cybersecurity risk. The system where the mitigation action includes any one of: providing a software update, modifying an user permission, implementing an access control, disabling a compromised account, implementing a software patch, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
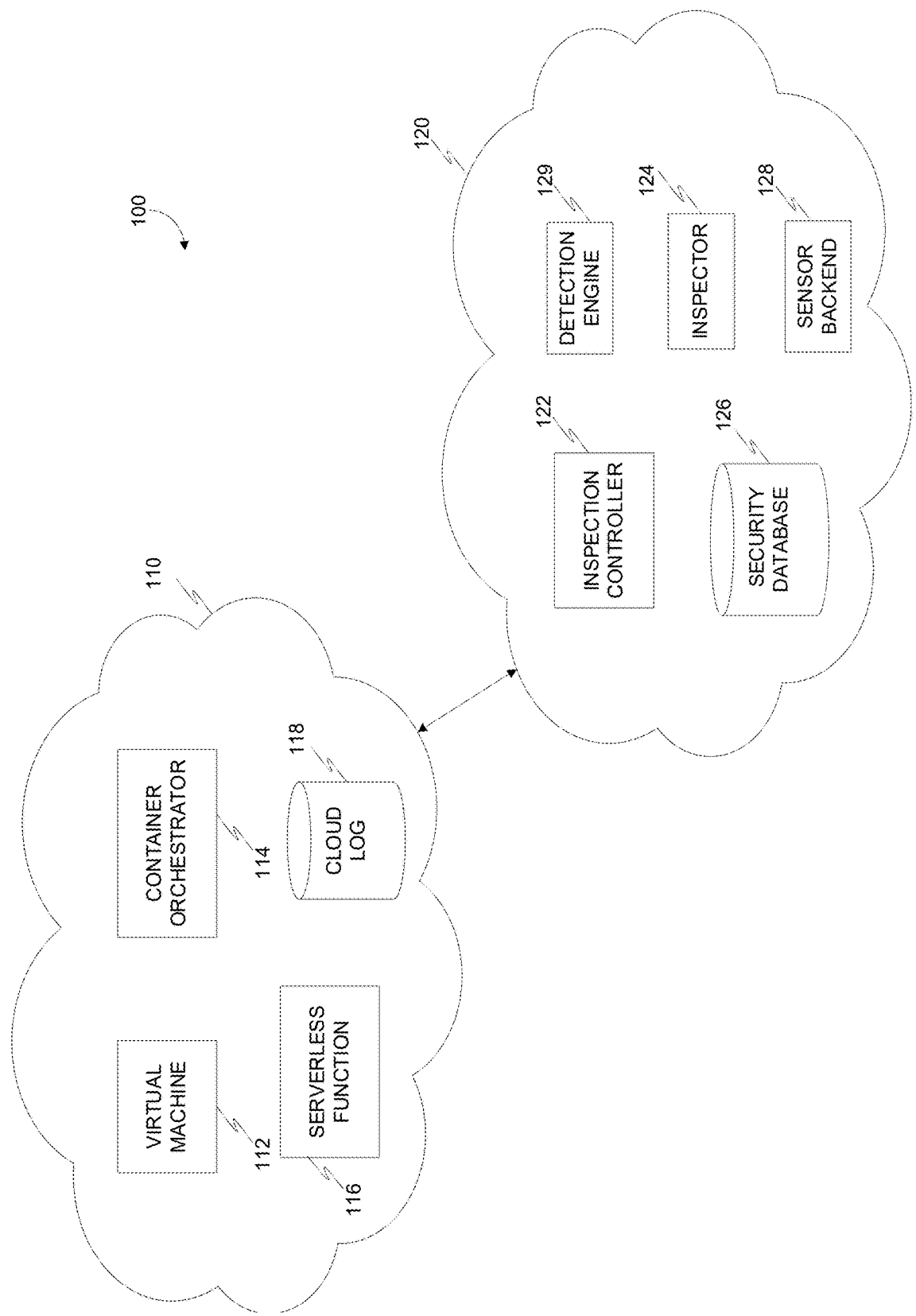
FIG. 1 is an example schematic diagram of a cloud computing environment monitored for a cybersecurity threat by an inspection environment, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method of cybersecurity threat detection for cloud entity groups, in a cloud computing environment. In an embodiment, a sensor is a software package executable on a machine, such as an endpoint machine. In some embodiments, an endpoint machine (or simply "endpoint") is, for example, a proxy, a gateway, a reverse proxy, a webserver, and the like. In various embodiments, a sensor is able to deploy on an endpoint utilizing less resources than an agent, as the sensor is configured to retrieve and analyze less data than an agent software is. This is due to the sensor capabilities being complemented by a static analysis solution, such as a cybersecurity threat inspector, in an embodiment.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. In some embodiments, the sensor is configured, for example, to apply a rule from the requested rules, definitions, and the like, to an event detected by listening on the eBPF interface of a machine on which the sensor is deployed. In certain embodiments, the sensor is configured to send an event to the sensor backend server, for example in response to determining that the event matches a predefined definition.

In certain embodiments, the sensor is configured to send an event, for example, based on a predetermined definition, to a sensor backend server, which is configured to store the event on a security database. In an embodiment, the security database includes a representation of the cloud computing environment in which the endpoint is deployed. For example, in an embodiment, the sensor is configured to detect that the endpoint sent a network packet to an Internet Protocol (IP) address which is associated with a known cybersecurity risk, such as a coin mining pool. The sensor is configured to generate a notification to a sensor backend server, in some embodiments.

In an embodiment, the sensor backend server is configured to generate an instruction for an inspection controller. In some embodiments, the inspection controller, in turn, is configured to provision an inspector to inspect the endpoint for the presence of a crypto miner malware.

In various embodiments, by performing runtime and static analysis in this manner, the overlap in detection between the sensor and inspector is reduced. Additionally, in an embodiment, the sensor is able to initiate inspection by the inspector, which allows efficient prioritizing of inspection resources, thereby reducing time to detection of cybersecurity threats, which also reduces time to respond to cybersecurity threats.

According to an embodiment, a detection engine which receives runtime data enriched with a state of entities detected in the runtime data allows for detection of cybersecurity risks and assigning severity to such risks, for example in order to prioritize mitigation. In an embodiment, a detection engine provides for the detection of cybersecurity threats for cloud entity groups based on the state of cloud entity components and the detection of cybersecurity risks.

FIG. 1 is an example schematic diagram 100 of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like.

A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments, a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as a virtual machine 112, a software container orchestrator 114, a serverless function 116, and a cloud log 118. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

In an embodiment, the cloud log 118 is configured to store events in a cloud computing environment 110. In some embodiments, the cloud log is configured to store runtime events from a runtime sensor. An event is an occurrence or action in a network that results in unauthorized access to, disruption, and misuse, a combination thereof and the like, of a computer network, in some embodiments. For example, in an embodiment, an event is an unsuccessful use login attempt, deletion of a file, unusual network communication, system modifications, notifications of security alerts, a combination thereof, and the like. In certain embodiments, the cloud log 118 is implemented as database which is deployed to run in a public or hybrid cloud environment and is managed by database-as-a-service (DBaaS) or deployed in a cloud-based virtual machine (VM).

Each such resource is susceptible to various cybersecurity threats. Such threats can become apparent for example due to a software version of an application in a software container orchestrator 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container orchestrator 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows the non-intrusive monitoring of the data link layer communication.

In some embodiments, the sensor is implemented as a runtime sensor that is configured to be deployed in operating systems and open source platform clusters. In certain embodiments, the runtime sensor is configured to monitor system behavior in real time to detect a cybersecurity threat. In an embodiment, the runtime sensor is configured to track the log system and entity behaviors in real time. For example, in an embodiment a runtime sensor is configured to monitor network activity and track any one of: user actions, file changes, system configurations, memory usage, a combination thereof, and the like.

In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor data which is generated from the sensor (e.g. runtime sensor). For example, the sensor backend server 128 is configured, in an embodiment, to receive events from a sensor. In some embodiments, the sensor is configured to request from the sensor backend server 128, rules, definitions, and the like, which the sensor is configured to apply to events. For example, in an embodiment, as detected on an eBPF interface. For example, in an embodiment, a predetermined event, such as indicating access to an IP address, IP address range, and the like, is checked against a definition. A definition is a logical expression which, when applied to an event, yields a "true" or "false" result, in an embodiment. In an embodiment, a rule is a logical expression which includes an action. For example, in an embodiment, a rule is that in response to a certain definition being true when applied to an event, data pertaining to the event should be sent to the sensor backend server 128.

In some embodiments, the sensor backend server 128 is configured to initiate inspection of a resource deployed in the cloud computing environment 110. For example, in an embodiment, the sensor backend server 128 is configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, in an embodiment, a sensor is configured to send log data to the sensor backend server 128 in response to detecting that a definition, applied by the sensor to a detected event, results in a "true" value when applied. As an example, in an embodiment, the definition may be "is the IP address in the range of 127.0.0.1 through 127.0.0.99", which in this example corresponds to an IP address range used by a malware, such as a crypto miner. In an embodiment, when the definition is applied, for example to a detected network packet, and the result is "true", the sensor is configured to send data pertaining to the event of the sensor backend server 128. In various embodiments, data pertaining to the event is, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, in an embodiment, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

In certain embodiments, the inspection environment 120 further includes a security database 126, on which a security is stored. In an embodiment, the security database is configured to store a representation of a cloud computing environment, such as cloud computing environment 110. For example, in an embodiment, the representation is based on a predefined unified data schema, so that each different cloud platform is represented using a unified data schema, allowing for a unified representation. For example, in an embodiment, a principal is represented by a predefined data structure, each principal represented by a node in the security graph. Likewise, a resource may be represented by another predefined data structure, each resource represented by a node in the security graph, in an embodiment.

In certain embodiments, sensor data that is received from a sensor deployed on a resource in the cloud computing environment is stored in the security database 126.

In various embodiments, the inspection environment 120 further includes a detection engine de. In an embodiment, the detection engine 129 is configured to detect cybersecurity threats and attacks based on detected events stored in the cloud log 118 and the state of entities (e.g. cloud entities) deployed in the cloud computing environment, a combination thereof, and the like. Further, in an embodiment the detection engine 129 is configured to access data from the cloud log 118. Moreover, the detection engine 129 is configured to receive sensor data from the runtime sensor, in some embodiments. In various embodiments, the detection engine 129 is configured to determine a state of events for each entity in the cloud computing environment 110.

In some embodiments, the detection engine 129 is configured to detect an anomaly based on the detection of an event and state of entities deployed in the cloud computing environment, a combination thereof, and the like. In most embodiments, the detection engine 129 is configured to initiate a remediation action based on the detected anomaly.

Figure 2:
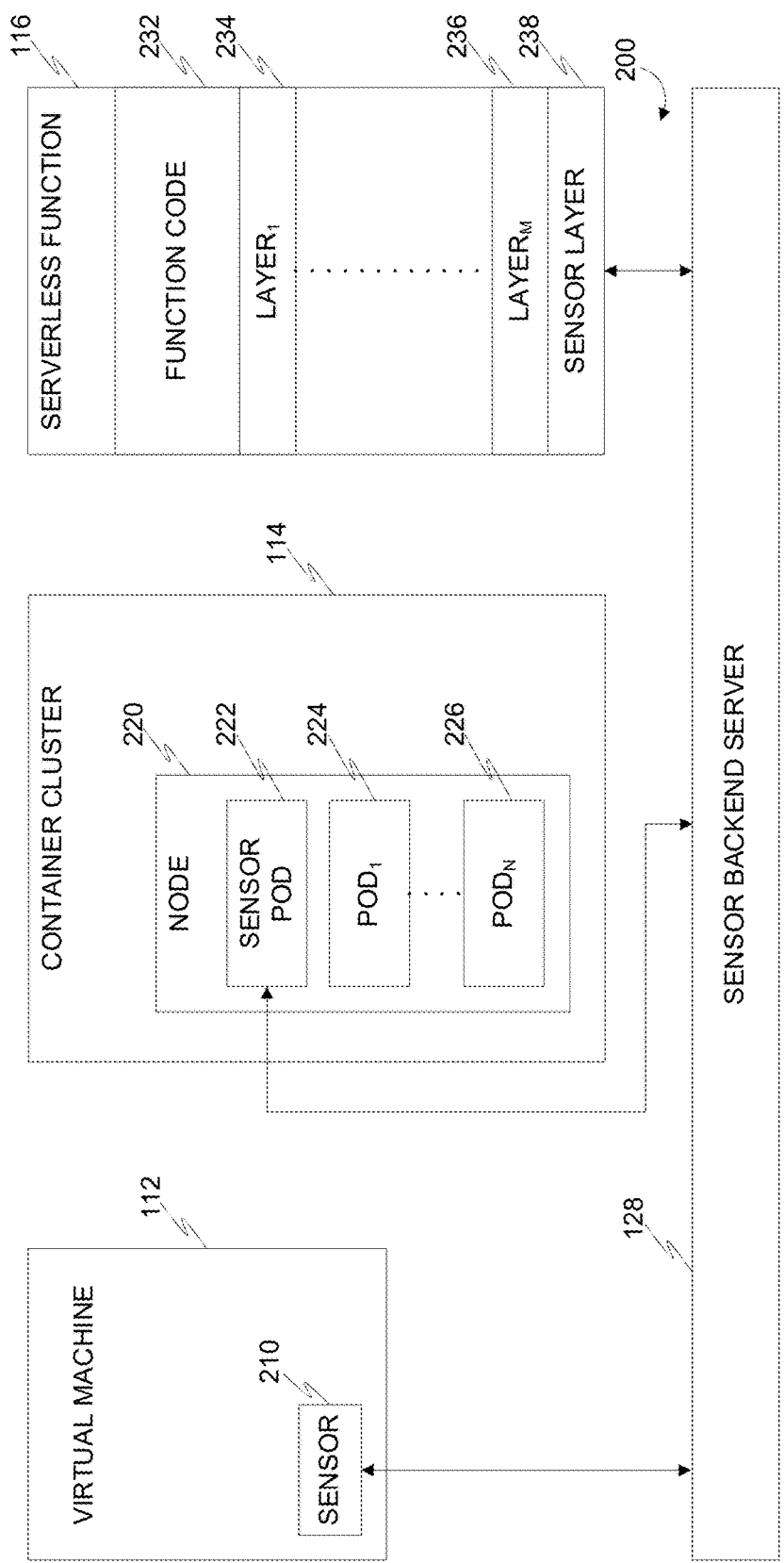
FIG. 2 is an example schematic illustration of a sensor backend server communicating with a plurality of sensors deployed on various workloads, implemented in accordance with an embodiment.

FIG. 2 is an example schematic illustration 200 of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments, where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend server 128, which when executed by the virtual machine 112 cause a sensor 210 to run as a service on the virtual machine 112. The sensor 210 is configured to listen to a data link layer communication, for example through an eBPF interface.

A software container orchestrator 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor 210, daemonset pod 222, and sensor layer 238 are each an implementation of a sensor, according to an embodiment. In an embodiment, a sensor is configured to communicate with a sensor backend server 128 through a transport layer protocol, such as Transmission Control Protocol (TCP). For example, the sensor backend server 128 is configured, in an embodiment, to listen to a predetermined port using a TCP protocol, and a sensor, such as sensor 210, daemonset pod 222, and sensor layer 238 are each configured to communicate with the sensor backend server 128, for example by initiating communication using TCP over the predetermined port.

Figure 3:
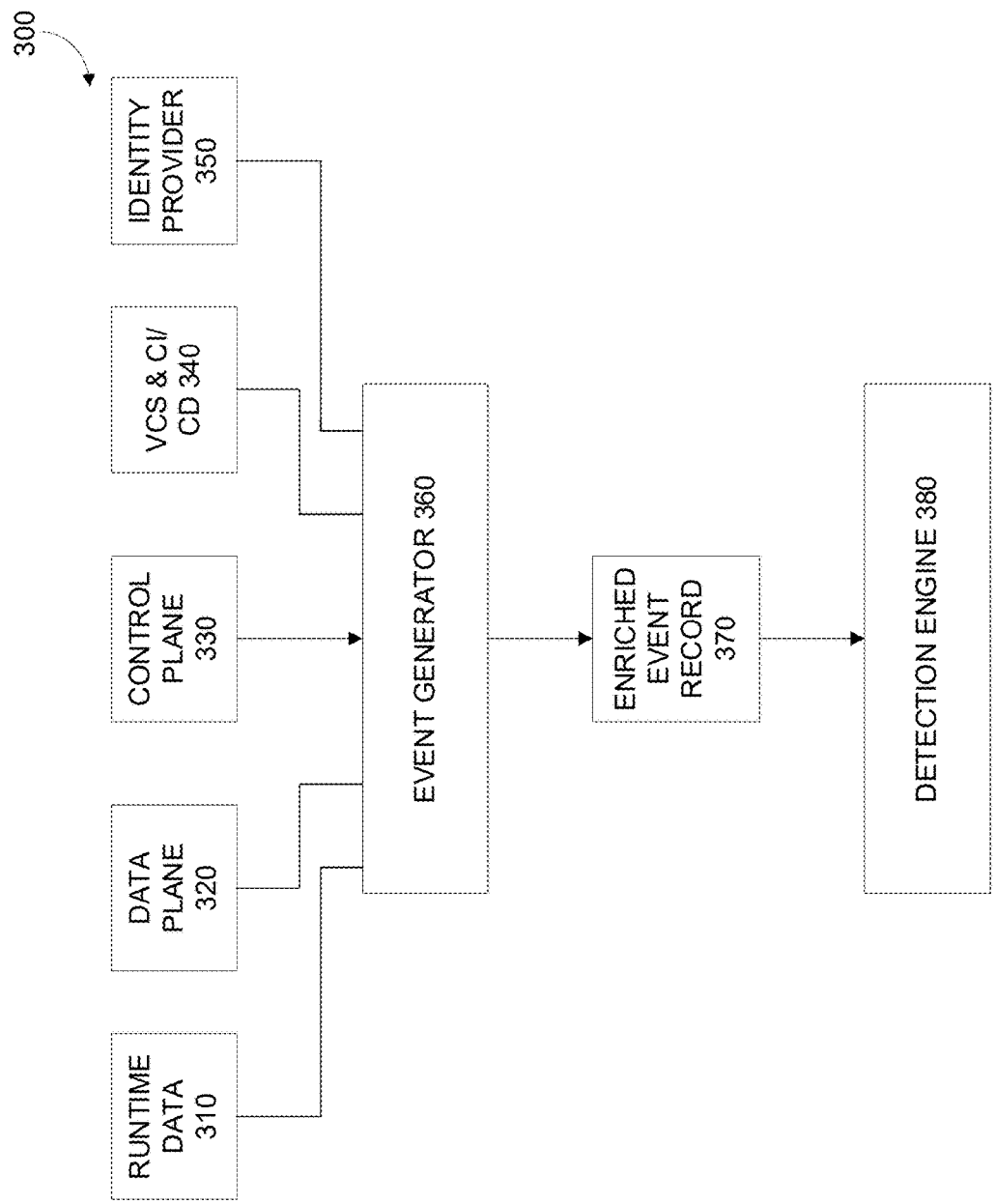
FIG. 3 is an example schematic illustration of a detection engine receiving an event record that is generated from an event generator, implemented in accordance with an embodiment.

FIG. 3 is an example schematic illustration 300 of a detection engine receiving an event record that is generated from an event generator, implemented in accordance with an embodiment.

It is advantageous to enrich raw event records with data from various sources, metadata, contextual information, a combination thereof, and the like, because enriched event records provide deeper context which make them beneficial for the improved detection of potential security risks, cybersecurity threats, vulnerabilities, and the like.

In an embodiment, an event generator 360 is configured to generate an enriched event record 370. In various embodiments, an enriched event record 370 is an event record that is enriched with additional data from various sources, contextual information, a combination thereof, and the like.

In certain embodiments, the event generator 360 is configured to receive runtime events, runtime data records, a combination thereof, from a runtime sensor, a cloud log, a combination thereof, and the like. In certain embodiments, a runtime event is a data record of an event. In an embodiment, runtime events are generated from a runtime sensor that is configured to listen for events of a resource in the computing environment.

In an embodiment, a runtime data record includes a principal, a resource identifier, an event, a command, a combination thereof, and the like. In various embodiments, a principal is an entity which is authenticated by a computer system, network, and the like. For example, in an embodiment, a principal includes a user account, a computer account, a service account, a role, a combination thereof, and the like. In an embodiment, a resource identifier identifies a resource which is an entity that provides access to a compute resource, such as a processor, a memory, a storage, and the like. In some embodiments, a resource is a virtual machine, a software container, a serverless function, and the like. For example, in an embodiment, a resource is a software application deployed thereon, such as a webserver, a gateway, a load balancer, a web application firewall (WAF), an appliance, and the like.

In an embodiment, an event is an occurrence, action, and the like, in a computing environment, in a network, etc. In some embodiments, the event indicates unauthorized access to, disruption, misuse, a combination thereof, and the like, to a computer network. For example, in an embodiment, an event is a failed login attempt, a deletion of a file, an unusual network communication, a system modification, a notification of a security alert, a software installation, a file upload, a combination thereof, and the like.

Runtime data is often not stateful, as in it is provided devoid of context on the principal, resource, process, and the like, which are linked to a particular event. The same event performed by a years old administrator account is not subject to the same level of suspicion as a brand-new account which initiated the same action. Without determining a previous state of entities in runtime data, for example, it is not possible to distinguish between these two events in terms of the risk level each possesses.

In various embodiments, the event generator 360 is configured to receive a runtime event, a runtime data record, and generate an enriched event record 370 from supplementing the runtime event, runtime data record, a combination thereof, with data from various data sources. In an embodiment, the various data sources include runtime data 310 (e.g., from a plurality of resources), a data plane 320, a control plane 330, a version control system (VCS) & CI/CD 340, an identity provider (IdP) 350, a combination thereof, and the like. In certain embodiments, the event generator 360 is configured to generate an enriched data record from a combination of data from various data sources including, runtime data 310, a data plane 320, a control plane 330, a Version Control System & Continuous Integration/Continuous Delivery (VCS & CI/CD) 340, an identity provider 350, a combination thereof, and the like.

In some embodiments, a control plane 330 is a virtual construct including resources which determine how resources are allocated in a computing environment, and how data in a computing environment is managed, routed, processed, a combination thereof, and the like. In an embodiment, a data plane 320 is responsible for the actual movement of data packets across resources of the computing environment. For example, in an embodiment, the data plane 320 is configured to forward IP packets across an IP network based on instructions from the control plane. In some embodiments, the data plane 320 is configured to store data of the data packets it forwards across resources in the computing environment.

An example of a control plane is the Kubernetes® Control Plane, which manages the state and operations of a Kubernetes cluster. It includes components like the Application Programing Interface (API) server (handling requests), the scheduler (assigning workloads to nodes), and the controller manager (maintaining desired states). The control plane makes decisions about resource allocation, workload scheduling, and system health, while relying on etcd to store cluster state. It orchestrates all cluster activity but doesn't process data traffic directly, which is performed by the data plane, which runs on worker nodes.

For example, in an embodiment, the data plane 320 is configured to store the file data of a file it is transferring from one resource to another. In various embodiments, the event generator 360 is configured to access data stored in the data plane 320 and use it to generate an enriched event record 370. For example, in an embodiment, for the event of a file being transferred to a device, data plane data such as the file name, the device identifier, a timestamp, of when the file was transferred, a combination thereof, and the like, is utilized by the event generator 360 to generate an enriched event record 370.

An example of a data plane is the worker nodes in a Kubernetes cluster, which execute the actual workloads, such as running containers and managing network traffic. The data plane handles all application-level data processing and enforces decisions made by the control plane. For instance, it receives scheduling instructions from the control plane to start or stop pods, manages container runtimes like Docker or Container Runtime Interface (CRI-O), and facilitates network communication between services. While the control plane manages what should happen, the data plane ensures the tasks are executed and the data flows correctly between components.

In an embodiment, a version control system (VCS) 340 is a software tool that is configured to track, and manage changes made to software code (e.g. code objects). In various embodiments, the VCS 340 is configured to track every modification made to the software code and stores every modification version in a database. In an embodiment, a Continuous Integration/Continuous Delivery (CI/CD) 340 is configured to compile the incremental software code modifications and link and package them into a software deliverable. In an embodiment, the software deliverables are configured to be stored in an associated database.

An example of a Version Control System (VCS) 340 is Git®, a widely used tool for tracking changes in code and collaborating on software projects. Git is used to create repositories where all changes to code files are recorded, enabling them to revert to earlier versions, track which user authorized changes, and collaborate between multiple user accounts. Features like branching and merging allow multiple users to work on different features simultaneously without overwriting each other's work.

In various embodiments, the event generator 360 is configured to access the code objects, software modifications, code object modifications, software deliverables, a combination thereof, and the like, from a database, to generate an enriched event record 370. For example, in an embodiment, the event generator 360 is configured to detect a code object modification that represents an event, action, command, and the like. In some embodiments, the event generator 360 is configured to utilize the event represented by the detected code object to generate an enriched event record 370.

In various embodiments, an identity provider (IdP) 350 is configured to manage and store the user identities of principals of a computing system. In an embodiment, the IdP 350 authenticates user identity and credentials for a computing system. In an embodiment, for example, an IdP includes Okta®, OneLogin®, Auth0®, and the like. In various embodiments, the identity provider (IdP) 350 stores user identity data, authentication data, authorization data, security data, a combination thereof, and the like. For example, in an embodiment, an identity provider 350 stores user identity data including a username, an email address, a phone number, a profile picture, a combination thereof, and the like.

In certain embodiments, for example, an IdP 350 is configured to store authentication data, including passwords, authentication tokens, backup codes, a combination thereof, and the like. In an embodiment, for example, an IdP 350 is configured to store authorization data including user roles, permissions, access control policies, group memberships, a combination thereof, and the like. In some embodiments, for example, an IdP 350 is configured to store security data, including IP addresses, failed login attempts, geolocation, security-related logs, a combination thereof, and the like.

In some embodiments, the event generator 360 is configured to access the stored identity data, authentication data, authorization data, security data, a combination thereof, and the like to generate an enriched event record 370. For example, in an embodiment, the event generator 360 is configured to associate a runtime event of a failed login attempt, and cross check this event with user identity data of the IdP 350 to obtain further user information for this event and supplement the data for this event in an enriched event record 370. For example, the IdP 350 may indicate that a token was recently revoked, therefore a failed login attempt would be normal until the principal obtains a new token.

In an embodiment, the event generator 360 is configured to enrich a runtime event with data from various sources including runtime data 310, a data plane 320, a control plane 330, a VCS &CI/CD 340, an IdP 350, a combination thereof, and the like. In some embodiments, the event generator 360 is configured to generate an enriched event record 370 with data from various sources including a runtime data 310, a data plane 320, a control plane 330, a VCS & CI/CD 340, an IdP 350, a combination thereof. In an embodiment, an enriched event record 370 includes additional data such as previous user actions, location of a resource, age of user, email of user, event types, age of user account, event types, a combination thereof, and the like.

In certain embodiments, an enriched event record includes data that has been cross checked with data across various sources. For example, in an embodiment, a failed login attempt event from a runtime event is confirmed with user identity data stored in the IdP 350, and this information is used to generate an enriched event record with further information of the principal such as their username, email, geolocation, a combination thereof, and the like.

In an embodiment, a detection engine 380 is configured to access an enriched event record 370 and apply a policy which includes a predetermined rule, a conditional rule, a condition, and the like, to the enriched event record 370. In various embodiments, the detection engine is configured to apply a policy to detect potential threats, malicious activity, cybersecurity risks, toxic combinations, and the like. In an embodiment, for example, a policy includes initiating a mitigation action in response to the detection of a specific event (e.g. software installation), determining that a condition of the policy is satisfied, determining that a condition of the policy is not satisfied, etc.

For example, in an embodiment, a conditional rule includes initiating a mitigation action in response to the detection of three or more failed login attempts within an hour from an unauthorized user. In an embodiment, for example, a predetermined rule includes initiating the mitigation action of deploying a firewall policy to prevent a principal associated with a particular username from uploading files on a resource. In various embodiments, a mitigation action includes implementing a firewall policy, isolating a system, modifying permissions, disabling compromised accounts, a combination thereof, and the like.

Figure 4:
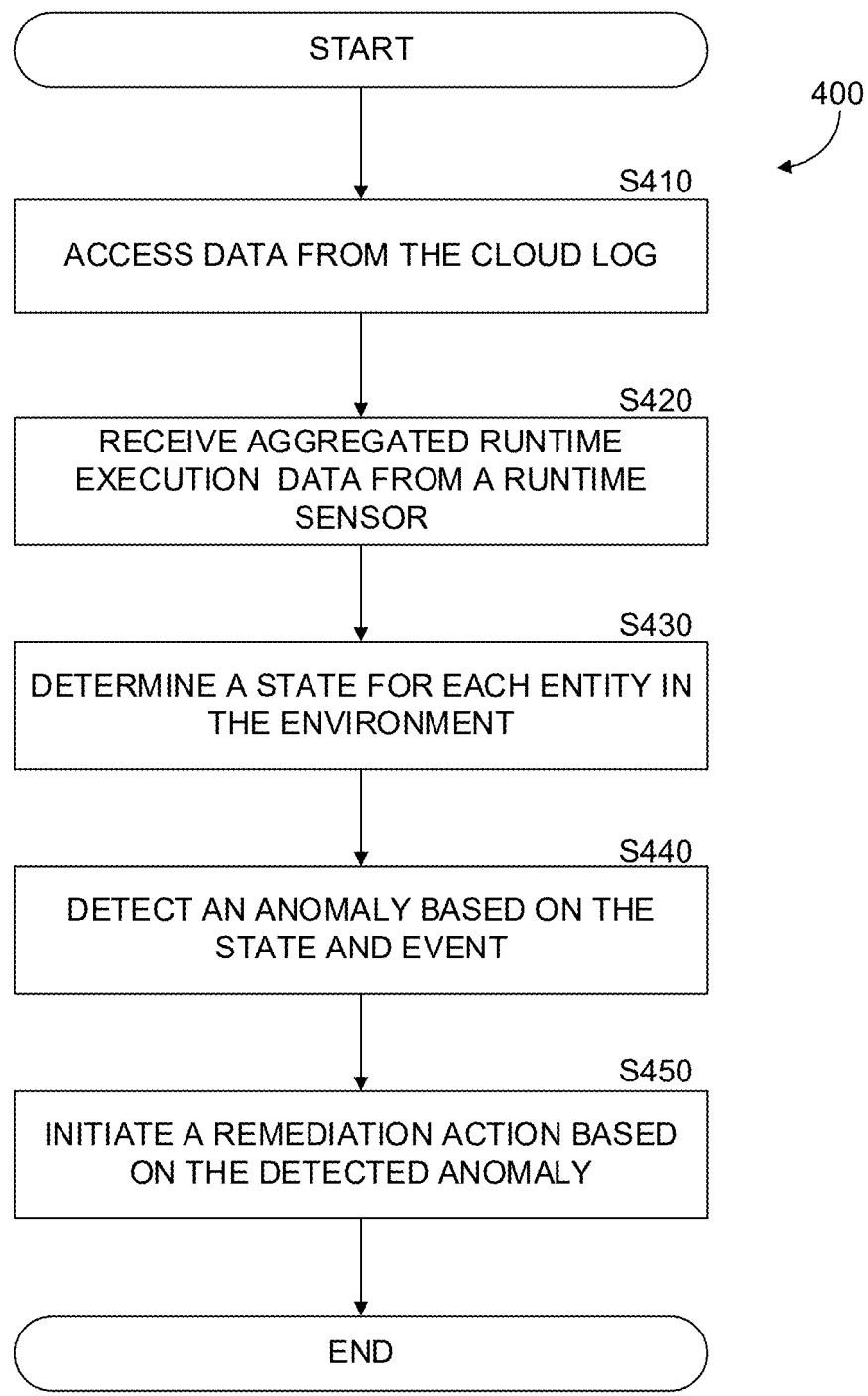
FIG. 4 is an example flowchart of a method for performing cybersecurity threat detection from runtime events using a stateful detection engine, based on a detected anomaly in a cloud computing environment, implemented in accordance with an embodiment.

FIG. 4 is an example flowchart 400 of a method for performing cybersecurity threat detection from runtime events using a stateful detection engine, based on a detected anomaly in a cloud computing environment, implemented in accordance with an embodiment.

At S410, log data is accessed. In an embodiment, log data is accessed from a cloud log. In an embodiment, a detection engine is configured to access log data from a cloud log. In some embodiments, the cloud log is configured to store system events. In various embodiments, the cloud log is configured to store log data which includes any data related to an event, an occurrence, event records, a combination thereof, and the like. In an embodiment, the detection engine is configured to detect the occurrence by accessing log data stored in the cloud log. In certain embodiments, the detection engine is configured to detect an event by analyzing and parsing the accessed log data from the cloud log.

In an embodiment, an event is an occurrence, action, and the like, in a computing environment, in a network, etc. In some embodiments, the event indicates unauthorized access to, disruption, misuse, a combination thereof, and the like, to a computer network. For example, in an embodiment, an event is a failed login attempt, a deletion of a file, an unusual network communication, a system modification, a notification of a security alert, a software installation, a file upload, a combination thereof, and the like.

In an embodiment, the detection engine is configured to access log data from the cloud log by requesting access from the network and receiving authorization from the network to access the log data.

At S420, runtime data is received. In an embodiment, the runtime data is received as aggregated runtime execution data from a sensor (e.g. runtime sensor). In some embodiments, the detection engine 129 is configured to receive aggregated runtime execution data from a sensor (e.g. runtime sensor)

In an embodiment, the sensor (e.g. runtime sensor) is deployed on a resource in the cloud computing environment. In some embodiments, the runtime sensor is configured to be deployed in operating systems, virtual machines, software containers, serverless functions, a combination thereof, and the like.

In an embodiment, the runtime sensor is configured to track processes running on a host, container, physical machine, hardware device, and the like. In certain embodiments, the runtime sensor is configured to perform real-time tracing of system calls, monitor resource (e.g., processor, memory, storage, network bandwidth, etc.) usage, a combination thereof, and the like. In various embodiments, the runtime sensor is configured to generate sensor data.

In some embodiments, sensor data includes data being sent, received, etc., by processes within the virtual machine, software container, serverless function, operating system, a combination thereof, and the like. In an embodiment, sensor data includes data generated from processes running on a host, container, physical machine, hardware device, and the like. In an embodiment, sensor data includes runtime events of an event-driven system.

In some embodiments, the runtime sensor is configured to aggregate the sensor data. In an embodiment, the runtime sensor is configured to aggregate portions of relevant data within the sensor data into a data group.

In various embodiments, the runtime sensor is configured to generate aggregated runtime execution data based on the aggregation of predetermined portions of sensor data into specific data groups. For example, in an embodiment, a predetermined portion corresponds to a data field (e.g., ID, timestamp, etc.) which is utilized to aggregate values from multiple event records into a single event.

In an embodiment, aggregating the sensor data of the runtime sensor is beneficial as the aggregated runtime execution data allows to transfer aggregated sensor data from a virtualization on which the runtime sensor is deployed to a backend server which is configured to further process such data. Further, in an embodiment, the aggregated runtime data is beneficial as it provides valuable insight into the real time events occurring on various resources of a computing environment. Thus, in an embodiment, the runtime data is useful in the detection of potential cybersecurity threats and vulnerabilities, particularly associated with events occurring in a computing environment.

At S430, a state is determined for an entity. In certain embodiments, the detection engine is configured to determine the state of each entity detected in the received runtime data. In an embodiment, the state of an entity is the status of the entity at a particular point in time, status of an entity over time, etc. For example, in certain embodiments, the state of an entity includes any one of: an operational status, login status, running state of an application, network traffic levels, access control for files, compliance states, a combination thereof, and the like. In some embodiments, an entity (e.g., cloud entity) is implemented as a principal, a resource, a combination thereof, and the like.

According to an embodiment, a state of an entity includes historical data, such as actions previously performed, metadata about the entity, data about past interactions of the entity with another entity, resource, etc., a combination thereof, and the like.

In various embodiments, the state of an entity is determined based on querying various data sources including a data plane, a control plane, a VCS & CI/CD platform, an IdP platform, a combination thereof, and the like, for the state of the entity. For example, in an embodiment, the state of a user account is determined based on querying an IdP and determining that the user account is suspended due to suspicious activity. In an embodiment, for example, the state of a code object is determined based on querying a VCS to determine if the code object has been committed to the VCS and saved to its repository.

At S440, an anomaly is detected. In an embodiment, the anomaly is detected based on the state and event. In various embodiments, a baseline for entity behavior is established from previous runtime data and various data sources including a data plane, a control plane, a VCS, an IdP, a combination thereof, and the like. In an embodiment, a baseline for entity behavior is established from events, runtime events, enriched data records, logs, a combination thereof, and the like stored in a cloud log. In an embodiment, historical log data from the cloud log for a specific entity is extracted from the cloud log and examined to identify patterns and previous entity behaviors. In some embodiments, statistical analysis (e.g. regression analysis, mean and standard deviation, etc.) is conducted on the historical log data to generate a baseline of entity behavior.

In an embodiment, an anomaly is an entity behavior that significantly deviates from the baseline of entity behavior. For example, in an embodiment, if a user login occurs of a machine, occurs regularly in a periodic pattern (e.g. daily, weekly cycle), a deviation of this pattern such as a user login at an unusual time, is flagged as an anomaly. For example, in an embodiment, an entity behavior that significantly deviates from the baseline includes an authorized user attempting to install an unknown application for the first time on a resource. In an embodiment, an anomaly is an indication of a potential cybersecurity threat, security risk, vulnerability, a combination thereof, and the like.

At S450, a remediation action is initiated. In an embodiment, the remediation action is initiated based on the detected anomaly, in response to detecting the anomaly, etc. In various embodiments, a remediation action is initiated based on the detected anomaly based on the state of an entity of the cloud computing environment and the detection of an event, a combination thereof, and the like. In certain embodiments, the detection engine is configured to initiate a remediation action in response to the detection of the anomaly. In some embodiments, a remediation action includes any one of: revoking access to a workload, revoking access to an entity, revoking access from a resource, a combination thereof, and the like.

Figure 5:
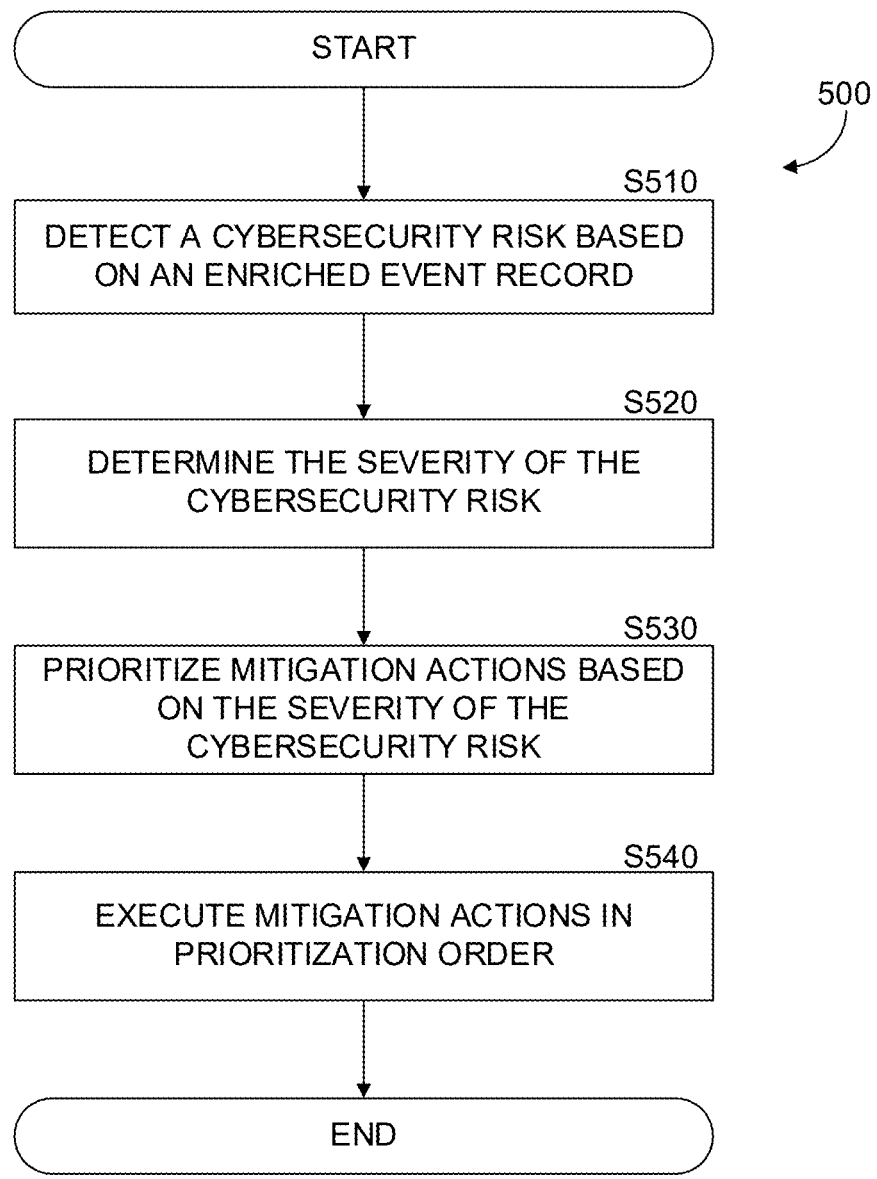
FIG. 5 is an example method for executing mitigation actions in a prioritized order based on the severity of a cybersecurity risk.

FIG. 5 is an example method 500 for executing mitigation actions in a prioritized order based on the severity of a cybersecurity risk. It is advantageous to rank the severity of cybersecurity risks as this allows for the optimization of efforts and the prioritization of the allocation of resources for remedial measures that are most beneficial in resolving the potential cybersecurity issues.

At S510, a cybersecurity risk is detected based on an enriched event record. In various embodiments, an enriched event record is an event record that is enriched with additional data from various sources, contextual information, a combination thereof, and the like. In various embodiments, an event generator is configured to receive a runtime event, a runtime data record, and generate an enriched event record from supplementing the runtime event, runtime data record, a combination thereof, with data from various data sources.

In an embodiment, the various data sources include runtime data (e.g., from a plurality of resources), a data plane, a control plane, a version control system (VCS) & CI/CD, an identity provider (IdP), a combination thereof, and the like. In certain embodiments, an event generator is configured to generate an enriched data record from a combination of data from various data sources including, runtime data, a data plane, a control plane, a VCS & CI/CD, an identity provider, a combination thereof, and the like.

In an embodiment, an enriched event record includes various data fields including an event type, an event identifier, a timestamp of when the event occurred, a resource, a host, a geo-location, the duration of an event, a principal, a principal email, a username, a location of resource, a combination thereof, and the like.

In some embodiments, a detection engine is configured to access an enriched event record from a cloud log. In an embodiment, a detection engine is configured to apply a rule, a conditional rule, a condition, and the like, to an enriched data record, for the detection of a cybersecurity risk. For example, in an embodiment, the detection engine is configured to implement the conditional rule of detecting a cybersecurity risk, in response to an unauthorized user attempting to install an unknown software on a resource. In an embodiment, for example, the detection engine is configured to implement a conditional rule such as detecting a cybersecurity risk in response to three failed login attempts from an unknown user. In an embodiment, for example, a conditional rule includes detecting a cybersecurity risk in response to receiving an alert from an antivirus software system, endpoint detection system, and the like.

In various embodiments, a cybersecurity risk indicates the potential of a cybersecurity attack, a vulnerability, a data breach, a combination thereof, and the like. In an embodiment, a cybersecurity risk is indicated by data of an enriched event record including data from various data sources including, runtime data, a data plane, a control plane, a VCS & CI/CD, an identity provider, a combination thereof, and the like. In some embodiments, data of an enriched event record including event type, amount of event occurrences, duration of event, resource type, principal type, a combination thereof, and the like, is utilized to detect a cybersecurity risk.

At S520, a severity of the cybersecurity risk is determined. In an embodiment, the severity of a detected cybersecurity risk of an enriched event application is ranked, scored, and the like. In various embodiments, the score of the severity of the detected cybersecurity risk is qualitative, quantitative, a combination thereof.

In an embodiment, a qualitative score is generated based on a qualitative risk assessment, which ranks the severity of a cybersecurity risk based on the likelihood of occurrence of an actual threat, magnitude of impact of the potential threat on the computing environment, a combination thereof, and the like. In some embodiments, a qualitative score is subjective.

In an embodiment, the DREAD model is utilized to generate a qualitative score of the detected cybersecurity risk. In various embodiments, the DREAD model utilizes four categories to determine the score of a cybersecurity risk. In an embodiment, the four categories include damage, reproducibility, exploitability, affected users, and discoverability. In an embodiment, the category of damage of the DREAD model evaluates the severity of the amount of damage the potential cybersecurity attack would incur. The category of reproducibility of the DREAD model evaluates the easiness of reproducing the cybersecurity attack, in an embodiment. In some embodiments, the category of exploitability of the DREAD model evaluates the amount of work it requires to launch the cybersecurity attack. In an embodiment, the category of affected users of the DREAM model evaluates the number of individuals that would be potentially impacted by the cyber attack. In an embodiment, the category of discoverability of the DREAD model evaluates how easily the vulnerability, cyber attack, and the like, can be found. In some embodiments, based on the qualitative risk assessment a qualitative score of "low", "medium", or "high" is assigned to the detected cybersecurity risk of the enriched event record.

In an embodiment, a quantitative score of the detected cybersecurity risk is generated from a quantitative risk assessment. In an embodiment, a quantitative risk assessment score is objective, and quantifies the detected cybersecurity risk based on definite numbers, figures, percentages for asset valuation, risk factors (e.g. frequency, magnitude), mathematical computations, a combination thereof, and the like.

In some embodiments, a quantitative risk assessment assigns a numerical value as a score to the detected cybersecurity risks of an enriched event record, in order to quantify the potential impacts and likelihood of security incidents. In some embodiments, a quantitative risk assessment provides a monetary value to risk components and generates a monetary value determination which is the risk score value assigned to an enriched event record.

In various embodiments, a quantitative risk assessment quantifies the detected cybersecurity risk by using data of the enriched event record to determine the degree of vulnerability, the likelihood of the threat being carried out, a combination thereof, and the like.

For example, in an embodiment, an enriched event record including an event of an unknown file upload, on a resource of a storage, for a duration of 3 hours, from an unknown username, is assigned a cybersecurity risk of "high" based on qualitative risk assessment. In an embodiment, for example, an enriched event record including an event of a successful login attempt, from a known user, at a timestamp of 9:00 am, is assigned a cybersecurity risk of 2 based on quantitative risk assessment.

At S530, mitigation actions are prioritized based on the severity of the cybersecurity risk. In an embodiment, a mitigation action is initiated in response to a detection of a cybersecurity risk of an enriched event record. In various embodiments, mitigation actions are prioritized based on the severity score of the detected cybersecurity risk of an enriched event record. In an embodiment, a mitigation action includes, revoking access, isolating a system, modifying permissions, disabling compromised accounts, implementing a firewall policy, implementing a software patch, a combination thereof, and the like.

In some embodiments, mitigation actions are prioritized based on an event type, a predetermined rule, user preferences, a combination thereof, and the like. For example, in an embodiment, for an enriched event record including an event of an unknown file upload, from an unknown username, with a cybersecurity risk value of "high", mitigation actions such as revoking access and modifying unknown user permissions are prioritized over other mitigation actions (e.g., implementing a firewall policy, providing a software patch, etc.), as these mitigation actions effectively resolve this specific event type. In an embodiment, for example, in response to a predetermined rule of implementing the mitigation action of blocking user access after three failed login attempts, this mitigation action is prioritized over other actions.

In certain embodiment, some mitigation actions are executable in a first environment of a cloud computing environment, while other mitigation actions are executable in a second environment of the cloud computing environment. For example, in an embodiment, an enriched data record indicates that a user is utilizing a resource with a forbidden communication (e.g., attempting to contact a forbidden IP address). A mitigation action can revoke access from the user, revoke access from the resource (e.g., block communication from a VM), update a code object from which the resource was deployed to block such future occurrences, etc.

In some embodiments, revoking access from a user is performed utilizing an IdP (i.e., a first environment), updating a code is performed using a VCS (i.e., a second environment), and revoking access from a resource is performed in a data plane (i.e. a third environment). In an embodiment, each such action is prioritized based on the environment it is executed in. This allows, for example, an organization to define preferences in where mitigation actions are performed to resolve cybersecurity risks.

At S540, at least a mitigation action is executed based on a prioritization. In some embodiments, the detection engine, the inspection controller, a combination thereof, and the like, is configured to initiate mitigation actions in a cloud computing environment, in environments of the cloud computing environments, etc., in the order of prioritization.

For example, in an embodiment, if the prioritization order of mitigation actions is to first block user access, second isolate the system, and third initiate software backup, the inspection controller is configured to execute these mitigation actions in that specific prioritization order. In an embodiment, for example, in response to a user having a predetermined preference of implementing a firewall instead of antivirus system, the inspection controller is configured to execute only the firewall and not the antivirus system.

Figure 6:
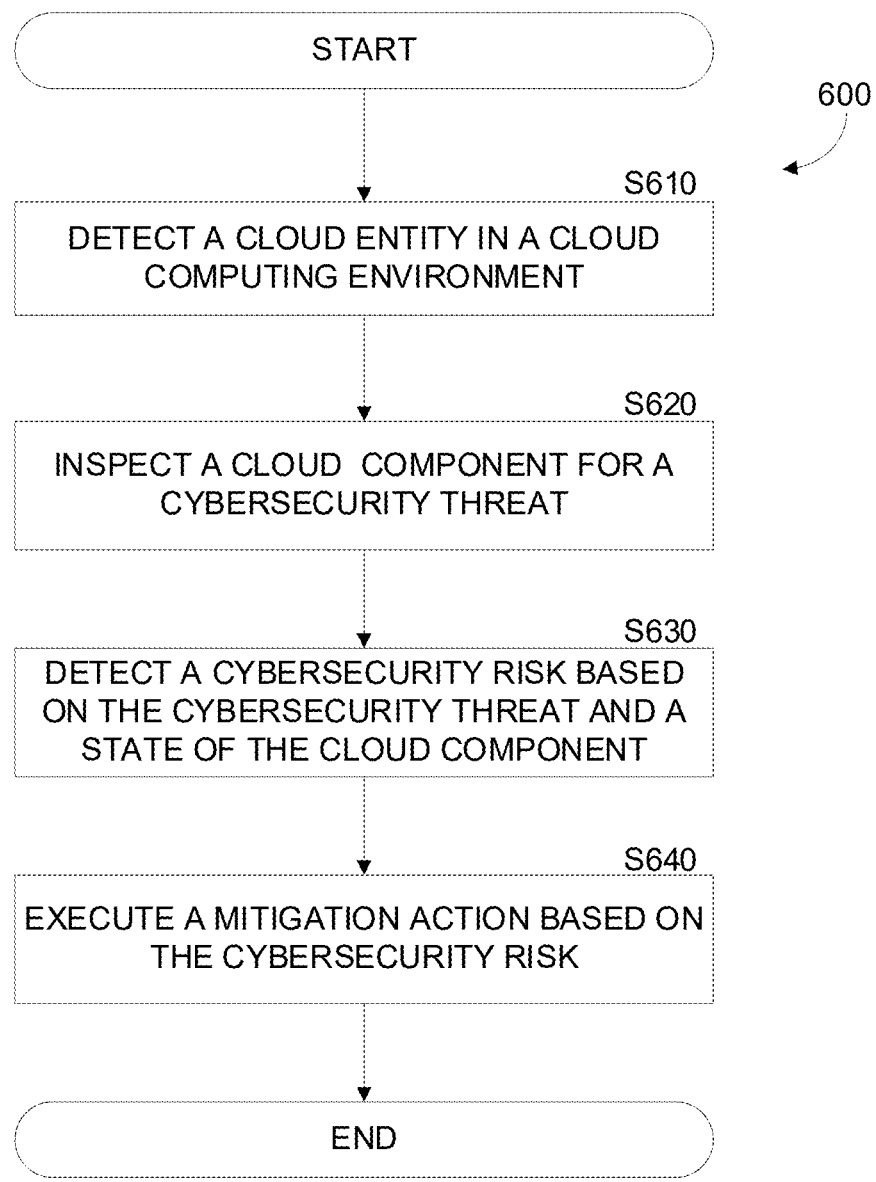
FIG. 6 is an example flowchart of a method for detecting cybersecurity threats for cloud entity groups, according to an embodiment.

FIG. 6 is an example flowchart 600 of a method for detecting cybersecurity threats for cloud entity groups, according to an embodiment. It is advantageous to utilize the state of cloud entities, cloud components, and the like, to detect cybersecurity threats as this provides for a more precise and accurate detection of actual threats in a cloud environment, thus reducing the false detection of non-threats. Further, in an embodiment, this method provides for rapid mitigation responses for cybersecurity threats, thus reducing the amount of cost and resource usage as a result of the damage caused by these threats.

At S610, a cloud entity is detected. In an embodiment, a cloud entity is detected in a cloud computing environment. In various embodiments a cloud entity is an object, resource, service, and the like, that operates within a cloud computing environment. For example, in an embodiment a cloud entity includes cloud computing infrastructure such as a hardware component, software resource, a combination thereof, and the like, that makes up the cloud computing environment, such as a server, a data storage, a virtual machine, and the like. In some embodiments, a cloud entity includes a plurality of components.

In an embodiment, for example, a cloud entity includes a cloud service such as Software as a Service (SAAS), Infrastructure as a Service (IaaS), Platform as a Service (PaaS), and the like. In an embodiment, for example, a cloud entity is deployed on a cloud provider such as Amazon® Web Services (AWS), Google® Cloud, Microsoft® Azure, and the like. In certain embodiments, a cloud entity includes a user account, a user profile, and the like.

In various embodiments, a cloud entity (e.g., cloud service) is detected by initiating a query of deployed cloud entities to a cloud Application Programming Interface (API) such as AWS API, Microsoft® Azure API, and the like.

In some embodiments, a cloud log is configured to store identifiers of cloud entities deployed in the cloud computing environment, log data, events, a combination thereof, and the like. In certain embodiments, a cloud log is accessed to detect a cloud entity. In an embodiment, a cloud log is inspected to detect a cloud entity. In certain embodiments, a cloud log is queried for the detection of cloud entities deployed in the cloud environment. In an embodiment, a state of a cloud entity is determined based on log data, events, enriched events, a combination thereof, and the like.

At S620, a component of the detected cloud entity is inspected. In various embodiments, a component of the detected cloud entity is inspected for a cybersecurity threat. In some embodiments, a component of a cloud entity includes a hardware component, a software component (e.g. software application), a virtual instance (e.g. software container, serverless function), a combination thereof, and the like, that is utilized by the cloud entity to perform a function.

For example, in an embodiment, a cloud component includes a server, a storage, a database, a load balancer, a serverless function, a container, and the like. For example, in an embodiment, a cloud entity is a virtual machine, and the cloud components of the virtual machine include a host system, a hypervisor, a user interface, and the like.

In an embodiment, for example, cloud components of a virtual machine (e.g. a serverless function, a container) are inspected for cybersecurity threats based on the inspection of a cloned disk associated with the virtual machine. In an embodiment, for example, a virtual machine has an attached disk which is a virtual storage device that is used to store an operating system, data associated with the virtual machine, software applications, software application data, software libraries, software binaries, a combination thereof, and the like.

In some embodiments, an inspectable disk is generated based on the attached disk. In certain embodiments, the inspectable disk is generated by cloning the disk of the virtual machine. In an embodiment, the inspectable disk is generated utilizing a snapshot, a disk copy, a disk clone, a combination thereof, and the like. In some embodiments, disk cloning is advantageous as it utilizes less computational resources. In an embodiment, the inspectable disk is inspected to detect a cybersecurity object.

In an embodiment a cybersecurity object indicates a new software application, a software artifact, a code artifact of a new software application, a software certificate, a code object, a library, a binary, a file, a combination thereof, and the like. In an embodiment, a cybersecurity object indicates a cybersecurity threat, a vulnerability, an exposure, a misconfiguration, a security breach, a combination thereof, and the like. For example, in an embodiment a cybersecurity object is "runtimedata60.exe", which is an executable file of a new software application (i.e., previously undetected or unknown application).

In an embodiment, static analysis is performed on code objects (e.g., computer-executable code) of the new software application, including examining the code object without fully executing it. It is advantageous to conduct static analysis on code objects of the new software application to identify a cybersecurity threat, security vulnerability, and the like.

In certain embodiments, a runtime sensor is configured to generate runtime data including data of processes running on cloud components (e.g., software applications). In some embodiments, the runtime data is stored as a runtime event in a cloud log. In certain embodiments, cloud components are inspected for cybersecurity threats based on examining the cloud log for instances of potential threats and attacks, vulnerabilities, a combination thereof, and the like.

In an embodiment, the runtime data is received from a runtime sensor, and is stored in an enriched event record. In various embodiments, an enriched event record is an event record that is enriched with additional data from various sources, contextual information, a combination thereof, and the like. In various embodiments, an event generator is configured to receive a runtime event, a runtime data record, and generate an enriched event record from supplementing the runtime event, runtime data record, a combination thereof, with data from various data sources.

In an embodiment, the various data sources include runtime data (e.g., from a plurality of resources), a data plane, a control plane, a version control system (VCS) & CI/CD, an identity provider (IdP), a combination thereof, and the like. In certain embodiments, an event generator is configured to generate an enriched data record from a combination of data from various data sources including, runtime data, a data plane, a control plane, a VCS & CI/CD, an identity provider (IdP), a combination thereof, and the like.

In an embodiment, an enriched event record includes various data fields including an event type, an event identifier, runtime data of a cloud component, cloud entity identifiers, a timestamp of when the event occurred, a resource, a host, a geo-location, the duration of an event, a principal, a principal email, a username, a location of resource, a combination thereof, and the like.

At S630, a cybersecurity risk is detected. In an embodiment, a cybersecurity risk is detected based on a cybersecurity threat and a state of a cloud component.

In various embodiments, a state of a cloud component including a state of a runtime process of a cloud component, a state of a principal (e.g., an identity), a combination thereof, and the like, is determined. In an embodiment, a state of a cloud component includes contextual information (e.g., historical context) related to the cloud component that is utilized to detect a cybersecurity risk. In an embodiment, contextual information provides historical context for a cloud component, cloud entity, and a combination thereof, in the form of previous events, previous actions, previous user actions, and the like. In various embodiments, contextual information is stored in an event log, in an enriched event record, in a cloud log, in an Identity and Access Management (IAM) log, a combination thereof, and the like.

For example, in an embodiment, a cybersecurity risk is detected in response to detecting a file being deleted by a user account (e.g., a cloud identity), that has historically never deleted files in the folder (e.g., the folder stored in a cloud storage, the cloud storage being a cloud component). In an embodiment for example, a cybersecurity risk is detected in response to an unauthorized user attempting to install a cloud component (e.g., a software application) on a resource, such as a virtual machine.

In various embodiments, a cybersecurity risk indicates the potential of a cybersecurity attack, a vulnerability, a data breach, a combination thereof, and the like.

In some embodiments, a cybersecurity risk is detected in response to the detection of both a cybersecurity threat of the cloud component and a state of the cloud component indicating a cybersecurity risk. In an embodiment, a cybersecurity risk is detected in response to only the state of a cloud component. By taking into account the state of a cloud component, a cloud entity, and the like, false positive threats are reduced, as the state provides additional context to events.

At S640, a mitigation action is initiated. In an embodiment, a mitigation action is executed based on the detection of a cybersecurity risk.

In some embodiments, a mitigation action is executed in a cloud computing environment, in environments of the cloud computing environments, etc., in response to the detection of a cybersecurity risk. In various embodiments, a mitigation action includes, providing a software update, modifying permissions, implementing access controls, blocking malicious IP addresses, disabling compromised accounts, implementing a software patches, a combination thereof, and the like. In various embodiments, a mitigation action is executed based on the type of cybersecurity risk.

In an embodiment, for example, in response to the cybersecurity risk of an unauthorized user attempting to install an unknown software application on a virtual machine, a mitigation action of deploying a firewall is executed. For example, in an embodiment, in response to the cybersecurity risk of a misconfiguration of a virtual machine, a mitigation action of a security patch is implemented.

Figure 7:
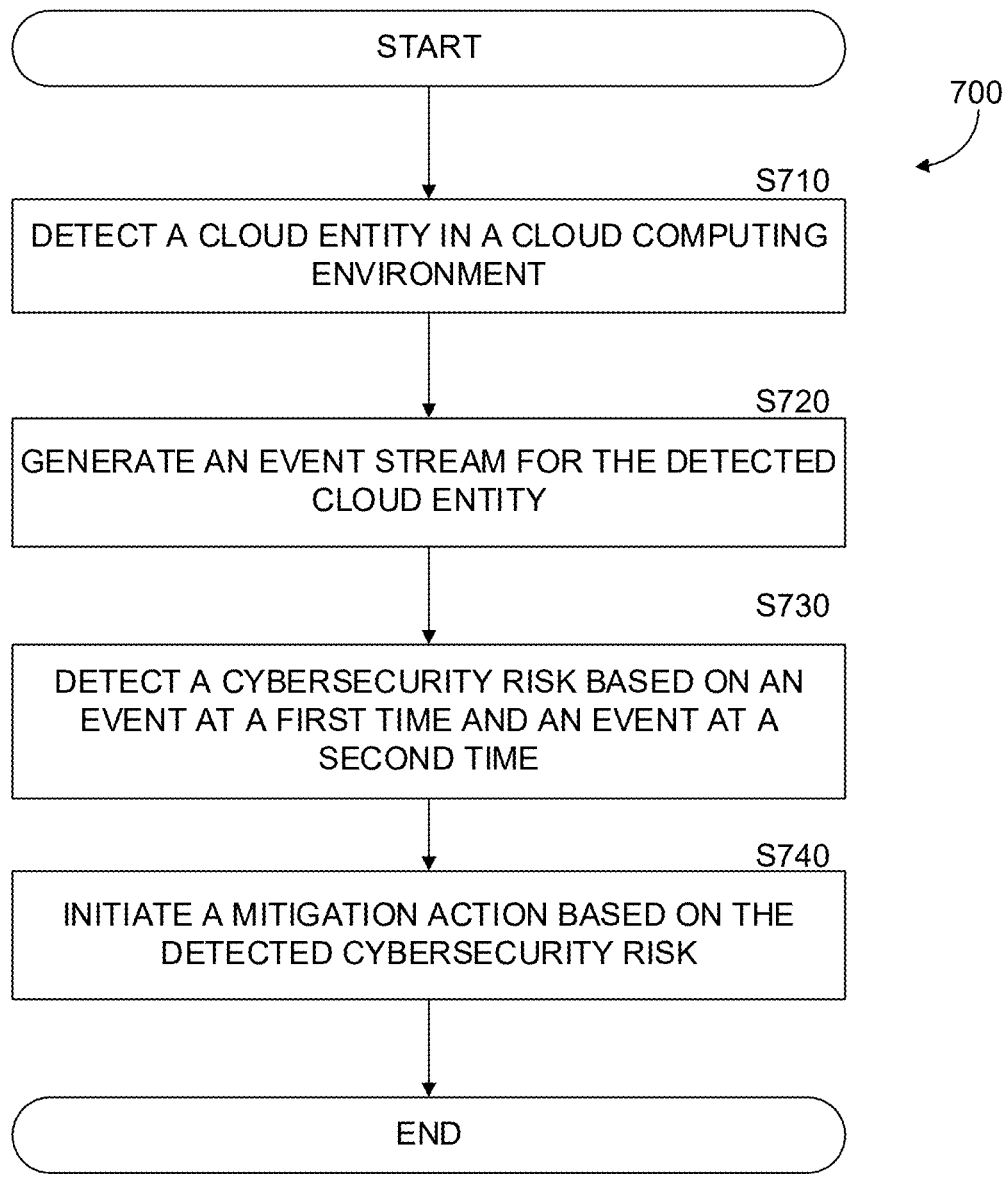
FIG. 7 is an example flowchart of a method for detecting cybersecurity threats utilizing stateful detection of a cloud entity data stream, according to an embodiment.

FIG. 7 is an example flowchart 700 of a method for detecting cybersecurity threats utilizing stateful detection of a cloud entity data stream, according to an embodiment. It is advantageous to utilize data streams of cloud entities, cloud components, and the like to detect cybersecurity threats as this provides for real time-detection of cybersecurity threats. Furthermore, this provides for a precise and accurate detection of actual threats in a cloud environment, thus reducing the false detection of non-threats.

Moreover, in an embodiment, utilizing cloud entity data streams for threat detection provides for rapid mitigation responses for cybersecurity threats, thus reducing the amount of cost and resource usage as a result of the damage caused by these threats. According to an embodiment, a cybersecurity risk, cybersecurity threat, and the like, is detected based on a state of the cloud entity, as determined over time. In an embodiment, events are received as an event stream which in and of themselves do not individually indicate a cybersecurity threat, for example, but when taken in order (i.e., of the event stream) then a combination of events are together a cybersecurity risk.

For example, according to an embodiment, an event at a first time indicates a change in a firewall policy which allows packets of a first type to pass through the firewall. An event at a second time indicates that a resource connected to the firewall opened a public IP address on a port. In an embodiment, each such event on its own does not constitute a risk, but together they pose a threat.

At S710, a cloud entity is detected in a cloud computing environment. In various embodiments a cloud entity is an object, resource, service, and the like, that operates within a cloud computing environment. For example, in an embodiment a cloud entity includes cloud computing infrastructure such as a hardware component, software resource, a combination thereof, and the like, that makes up the cloud computing environment, such as a server, a data storage, a virtual machine, and the like. In some embodiments, a cloud entity includes a plurality of cloud components.

In an embodiment, for example, a cloud entity includes a cloud service such as Software as a Service (Saas), Infrastructure as a Service (IaaS), Platform as a Service (PaaS), and the like. In an embodiment, for example, a cloud entity is deployed on a cloud provider such as Amazon® Web Services (AWS), Google® Cloud Platform (GCP), Microsoft® Azure, and the like. In certain embodiments, a cloud entity includes a user account, a user profile, and the like.

In various embodiments, a cloud entity (e.g., cloud service) is detected by initiating a query of deployed cloud entities to a cloud Application Programming Interface (API) such as AWS API, Microsoft® Azure API, and the like.

In some embodiments, a cloud log is configured to store identifiers of cloud entities deployed in the cloud computing environment, log data, cloud events, a combination thereof, and the like. In certain embodiments, a cloud log is accessed to detect a cloud entity. In an embodiment, a cloud log is inspected to detect a cloud entity. In certain embodiments, a cloud log is queried for the detection of cloud entities deployed in the cloud environment.

At S720, an event stream is generated for the detected cloud entity. In an embodiment, an event stream is a continuous real-time, near real time, etc., flow of events, cloud events, runtime events, enriched events, event data, a combination thereof, and the like. In various embodiments, the event stream includes events such as cloud events, runtime events, enriched events, network events, a combination thereof, and the like, of cloud entities, cloud entity components, a combination thereof, and the like, deployed in a cloud computing environment. In an embodiment, an event is an event record, including a cloud event record, a runtime event record, an enriched event record, and the like. In an embodiment, events and event records (e.g., cloud event records, runtime event records, enriched event records) are stored in a cloud log, an enriched event log, a runtime data log, a network log, a combination thereof, and the like. In certain embodiments, a single event stream is generated for a single cloud entity, wherein the cloud entity includes a plurality of cloud components.

In some embodiments, event streams for a cloud entity are generated from extracting events, event records, a combination thereof, and the like, from a cloud log, an enriched event log, a runtime data log, a network log, a combination thereof, and the like. In certain embodiments, an event stream for a cloud entity is generated from extracting events, event logs, a combination thereof, and the like, from a database, a storage device, a memory, and the like.

In an embodiment, a unique event stream is generated for a cloud entity based on cloud components that are utilized by the cloud entity to perform a function. In various embodiments, the event stream for a cloud entity includes events (e.g. cloud events, runtime events, etc.), event records (e.g., cloud event records, runtime event records, etc.), and a combination thereof, for each cloud component of a cloud entity. In an embodiment, an event stream for a cloud entity includes event streams for each cloud component that is utilized by the cloud entity to perform a function. In certain embodiments, an event stream for a cloud entity includes event stream for each cloud component that makes up the cloud entity of the cloud computing environment.

For example, in an embodiment, a generated event stream for a cloud entity (e.g., virtual machine), includes a runtime event record for a first cloud component (e.g., operating system) and a cloud event for a second cloud component (e.g., software application). In an embodiment, for example, a generated event stream for a cloud entity (e.g., virtual machine), includes an enriched event record for the cloud entity (e.g., based on runtime data and a cloud log), a cloud event for a component of the cloud entity, a combination thereof, and the like.

At S730, a cybersecurity risk is detected. In some embodiments, a cybersecurity risk is detected based on an event detected in an event stream of the cloud entity at a first time, and another event detected in the event stream at a second time. In some embodiments, the first event is associated with a first cloud component and a second event is associated with a second cloud component of the cloud entity. In an embodiment, an event stream of a cloud entity includes events, event records, and a combination thereof, for the specific cloud entity. For example, in an embodiment, an event stream for a cloud component of a hypervisor includes a runtime event record, an enriched event record, a network event record, etc.

In various embodiments, an event stream of a cloud entity includes events of a cloud component which are generated from extracting events, event records, and a combination thereof, from various data logs including a runtime event log, a cloud log, an enriched event log, a network log, a combination thereof, and the like. In an embodiment, for example, the runtime event record includes an identifier of the cloud component, an event associated with cloud component, a timestamp of when the event occurred, a combination thereof, and the like.

In some embodiments, a cybersecurity risk is detected for a cloud entity in response to events, event records, and a combination thereof, of event streams of multiple cloud components of the cloud entity indicating a potential cybersecurity risk. For example, in an embodiment, a cybersecurity risk is detected in response to a first event record (e.g., cloud event record) associated with a first cloud component (e.g., software application) and a second event record (e.g., runtime event record) associated with a second cloud component (e.g., binary library) of a cloud entity (e.g., virtual machine) indicate together the presence of a cybersecurity risk. In various embodiments, a cybersecurity risk indicates the potential of a cybersecurity attack, a vulnerability, a data breach, a combination thereof, and the like.

In an embodiment, a state is generated for the cloud entity, for components of the cloud entity, etc. In some embodiments, the cybersecurity risk is detected based on a detected change in the state of the cloud entity over time. For example, when a plurality of events occurring within a time frame is detected, this constitutes a change in the state of the cloud entity, according to an embodiment.

In certain embodiments, the plurality of events occurs in a predetermined order in the event stream. For example, in an embodiment, a first event occurring at a first time and a second event occurring at a second time (i.e., after the first time) triggers a detection, while the second event occurring at the first time with the first event occurring at the second time does not trigger a detection.

At S740, a mitigation action is initiated based on the detected cybersecurity risk. In an embodiment, a mitigation action is executed based on multiple cloud components of a cloud entity for which a cybersecurity risk is indicated.

In some embodiments, a mitigation action is executed in a cloud computing environment, in environments of the cloud computing environments, etc., in response to the detection of a cybersecurity risk of an associated cloud entity. In various embodiments, a mitigation action includes, providing a software update, modifying a user permission, implementing an access control, blocking a malicious Internet Protocol (IP) address, disabling a compromised account, implementing a software patch, a combination thereof, and the like.

In various embodiments, a mitigation action is initiated based on the type of cybersecurity risk. In certain embodiments, a mitigation action is initiated based on the type of cloud entity, cloud component, and a combination thereof, associated with the detected cybersecurity risk. For example, in an embodiment, in response to a potential cybersecurity risk of a cloud component of a software application, a mitigation action of a software patch is initiated.

In an embodiment, for example, in response to the cybersecurity risk of three failed user login attempts, a mitigation action of requiring the user to pass an authentication test is implemented. For example, in an embodiment, in response to the cybersecurity risk of a misconfiguration of a virtual machine, a mitigation action of a security patch is implemented.

Figure 8:
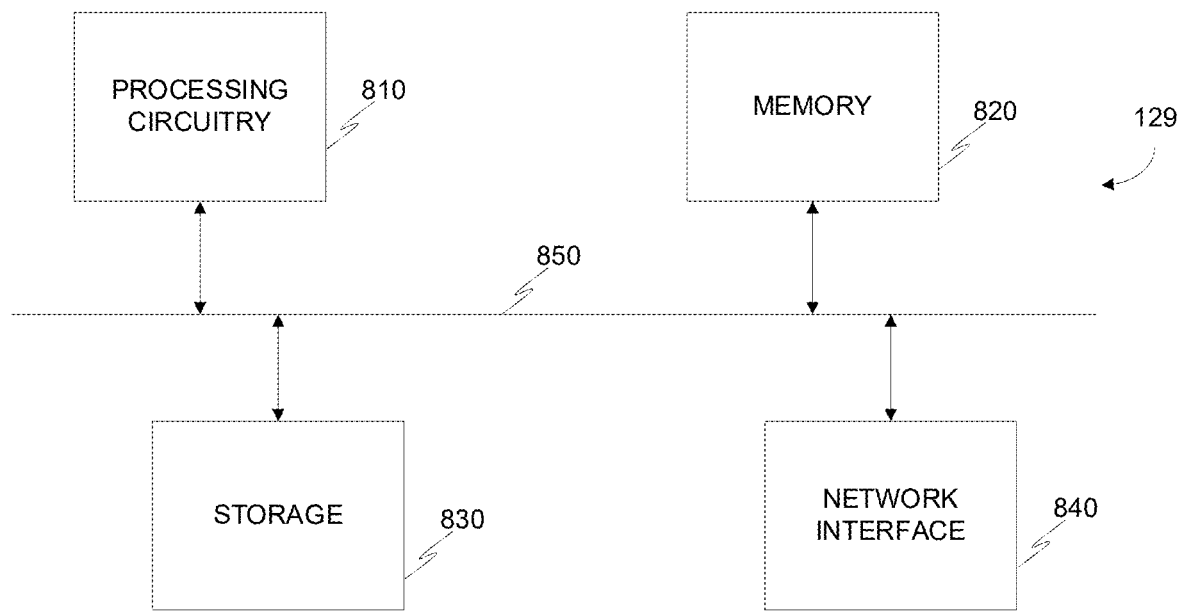
FIG. 8 is an example schematic diagram of a detection engine, according to an embodiment.

FIG. 8 is an example schematic diagram of a detection engine 129, according to an embodiment. The detection engine 129 includes a processing circuitry 810 coupled to a memory 820, a storage 830, and a network interface 840. In an embodiment, the components of the detection engine 129 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the detection engine 129 to communicate with, for example, a cloud log 118, an inspection controller 122, a sensor backend server 128, and the like.

It should be understood that the embodiments described herein are not limited to the specific architecture illustrated in FIG. 8, and other architectures may be equally used without departing from the scope of the disclosed embodiments.

Furthermore, in certain embodiments the detection engine 129, an inspector 124, and the like, may be implemented with the architecture illustrated in FIG. 8. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detection of cybersecurity threats utilizing stateful detection of a data stream of a cloud entity, comprising:
    detecting a cloud entity deployed in a cloud computing environment, the cloud entity including a plurality of cloud components;
    generating an event stream over a time period for the cloud entity, the event stream including events from each cloud component of the plurality of cloud components;
    detecting a cybersecurity risk based on: an event in the event stream at a first time in the time period and an event in the event stream at a second time in the time period after the first time; and
    initiating a mitigation action in the cloud computing environment based on the detected cybersecurity risk;
    wherein individually the event in the event stream at the first time in the time period and the event in the event stream at the second time in the time period after the first time do not constitute a cybersecurity risk but together the event in the event stream at the first time in the time period and the event in the event stream at the second time in the time period after the first time do pose a cybersecurity risk.

2. The method of claim 1, wherein the event at the first time is related to a first component.

3. The method of claim 1, wherein the event at the second time is related to a second component.

4. The method of claim 1, further comprising:
    storing a state of the cloud entity based at least on an event at a first time.

5. The method of claim 4, further comprising:
    detecting a change in the state of the cloud entity based on the event at first time and the event at a second time; and
    initiating the mitigation action in response to detecting the change in the state.

6. The method of claim 1, wherein detecting a cloud entity further comprises:
    querying a cloud log for a deployed cloud entity.

7. The method of claim 1, wherein generating an event stream for a cloud entity further comprises:
    extracting an event, an event record, and any combination thereof, from a cloud log, an enriched event log, a runtime data log, a network log, and any combination thereof.

8. The method of claim 1, wherein generating an event stream for a cloud entity further comprises:
    utilizing cloud components that are used by the cloud entity to perform a function.

9. The method of claim 1, further comprising:
    generating an event stream for a cloud component based on extracting events, event records, and any combination thereof, from various data logs including a runtime event log, a cloud log, an enriched event log, a network log, and any combination thereof.

10. The method of claim 1, wherein a cybersecurity risk indicates a potential of a cybersecurity attack, a vulnerability, a data breach, and any combination thereof.

11. The method of claim 1, further comprising:
    initiating a mitigation action based on a type of cloud entity associated with the detected cybersecurity risk.

12. The method of claim 1, wherein the mitigation action includes any one of: providing a software update, modifying a user permission, implementing an access control, disabling a compromised account, implementing a software patch, and any combination thereof.

13. A non-transitory computer-readable medium storing a set of instructions for detection of cybersecurity threats utilizing stateful detection of a data stream of a cloud entity, the set of instructions comprising:
    one or more instructions that, when executed by one or more processing circuitry of a device, cause the device to:
    detect a cloud entity deployed in a cloud computing environment, the cloud entity including a plurality of cloud components;
    generate an event stream over a time period for the cloud entity, the event stream including events from each cloud component of the plurality of cloud components;
    detect a cybersecurity risk based on: an event in the event stream at a first time in the time period and an event in the event stream at a second time in the time period after the first time; and
    initiate a mitigation action in the cloud computing environment based on the detected cybersecurity risk;
    wherein individually the event in the event stream at the first time in the time period and the event in the event stream at the second time in the time period after the first time do not constitute a cybersecurity risk but together the event in the event stream at the first time in the time period and the event in the event stream at the second time in the time period after the first time do pose a cybersecurity risk.

14. A system for detection of cybersecurity threats utilizing stateful detection of a data stream of a cloud entity comprising:
one or more processing circuitry configured to:
detect a cloud entity deployed in a cloud computing environment, the cloud entity including a plurality of cloud components;
generate an event stream over a time period for the cloud entity, the event stream including events from each cloud component of the plurality of cloud components;
detect a cybersecurity risk based on: an event in the event stream at a first time in the time period and an event in the event stream at a second time in the time period after the first time; and
initiate a mitigation action in the cloud computing environment based on the detected cybersecurity risk;
wherein individually the event in the event stream at the first time in the time period and the event in the event stream at the second time in the time period after the first time do not constitute a cybersecurity risk but together the event in the event stream at the first time in the time period and the event in the event stream at the second time in the time period after the first time do pose a cybersecurity risk.

15. The system of claim 14, wherein the event at the first time is related to a first component.

16. The system of claim 14, wherein the event at the second time is related to a second component.

17. The system of claim 14, wherein the one or more processing circuitry are further configured to:
store a state of the cloud entity based at least on an event at a first time.

18. The system of claim 17, wherein the one or more processing circuitry are further configured to:
detect a change in the state of the cloud entity based on the event at first time and the event at a second time; and
initiate the mitigation action in response to detecting the change in the state.

19. The system of claim 14, wherein the one or more processing circuitry, when detecting a cloud entity, are configured to:
query a cloud log for a deployed cloud entity.

20. The system of claim 14, wherein the one or more processing circuitry, when generating an event stream for a cloud entity, are configured to:
extract an event, an event record, and any combination thereof, from a cloud log, an enriched event log, a runtime data log, a network log, and any combination thereof.

21. The system of claim 14, wherein the one or more processing circuitry, when generating an event stream for a cloud entity, are configured to:
utilize cloud components that are used by the cloud entity to perform a function.

22. The system of claim 14, wherein the one or more processing circuitry are further configured to:
generate an event stream for a cloud component based on extracting events, event records, and any combination thereof, from various data logs including a runtime event log, a cloud log, an enriched event log, a network log, and any combination thereof.

23. The system of claim 14, wherein a cybersecurity risk indicates a potential of a cybersecurity attack, a vulnerability, a data breach, and any combination thereof.

24. The system of claim 14, wherein the one or more processing circuitry are further configured to:
initiate a mitigation action based on a type of cloud entity associated with the detected cybersecurity risk.

25. The system of claim 14, wherein the mitigation action includes any one of:
providing a software update, modifying a user permission, implementing an access control, disabling a compromised account, implementing a software patch, and any combination thereof.

* * * * *